March 21, 1967 F. F. KNIPSCHILD 3,309,788
APPARATUS FOR DRYING FRUIT AND VEGETABLES AND OTHER PRODUCTS
Filed Nov. 19, 1963
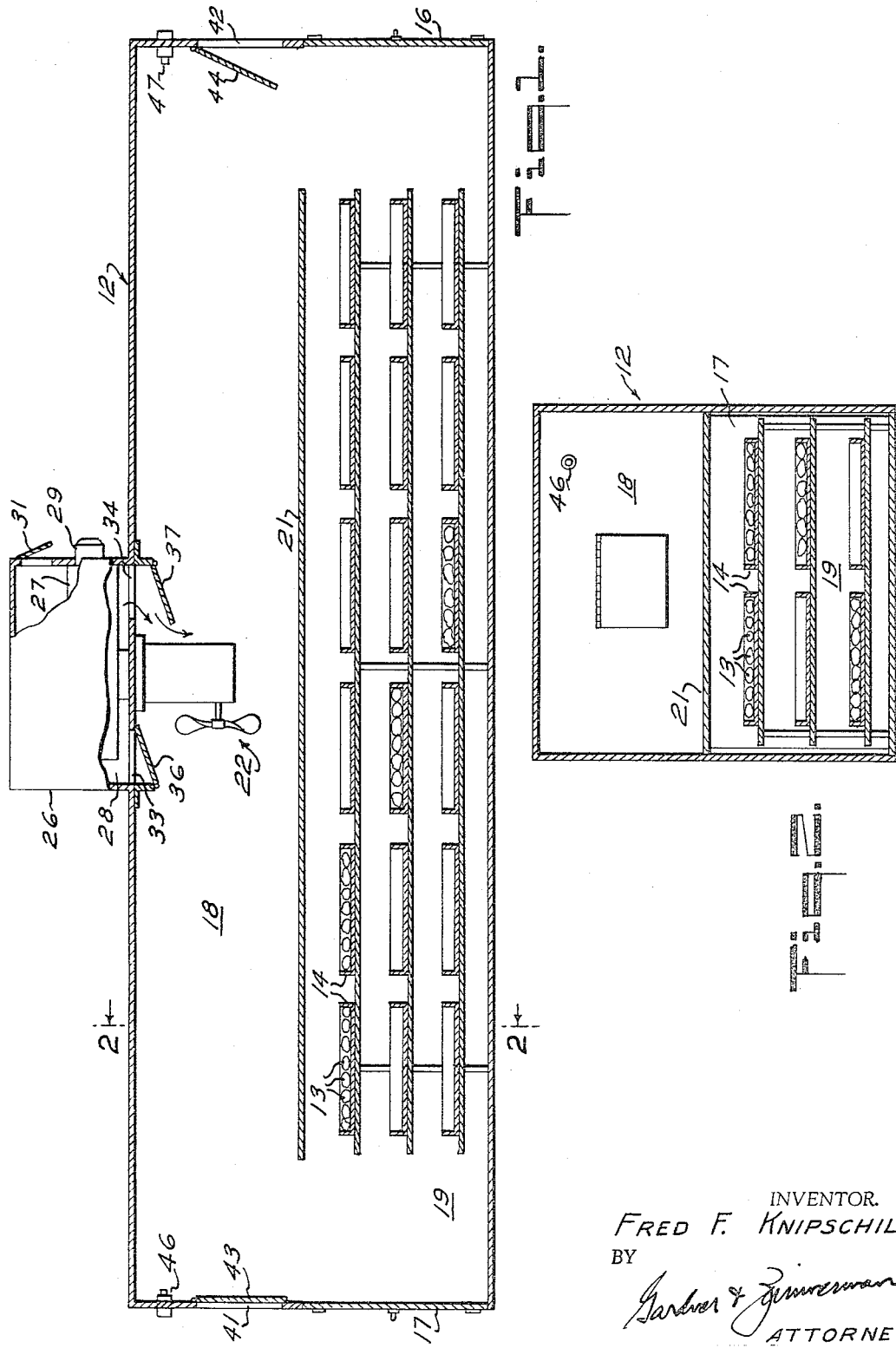
INVENTOR.
FRED F. KNIPSCHILD
BY
Gardner & Zimmerman
ATTORNEYS United States Patent Office
3,309,788
Patented Mar. 21, 1967

3,309,788
APPARATUS FOR DRYING FRUIT AND VEGE-
TABLES AND OTHER PRODUCTS
Fred F. Knipschild, 1057 Main St.,
St. Helena, Calif. 96042
Filed Nov. 19, 1963, Ser. No. 324,719
2 Claims. (Cl. 34—191)

This invention generally relates to systems utilized for removing water from food products, such as fruit and vegetables, and is more particularly directed towards a novel arrangement of a dehydration tunnel and the method of drying the products therein.

Dehydration tunnels have been widely used in connection with the drying of various food products and generally comprise an elongated heating chamber in which trays of the product are placed. By way of example, the product is conventionally deposited on flat trays which may be approximately three feet long by six feet wide, and the trays are then placed in the tunnel wherein heated air is circulated from one end of the tunnel to the other. Heretofore, the temperature of the air was limited to some predetermined temperature for each product, since product temperatures in excess of this amount resulted in carmelization or discoloration of the product. It will also be appreciated that with a conventional drying system, the product adjacent the hot air inlet would be dryer and hotter than the product at the other end of the tunnel, and accordingly, in some installations, provision was made for rotating the trays in the tunnel at the finish end to provide for a more uniform drying. Such arrangements are not completely satisfactory, since they either require relatively elaborate equipment or additional attention by the operator. It might also be pointed out that while the air temperature as above stated is limited to the highest safe temperature for a given product, higher temperatures are possible when the product is still wet, since the evaporation of the water serves to cool the product and thus avoid the deleterious effects of burning the sugars in the product or otherwise overheating or scorching the same.

It is accordingly an object of the present invention to provide a method and apparatus for drying a product uniformly throughout the length of the apparatus without the necessity of moving the product except progressively thru the tunnel, and in which the time required for drying is materially reduced.

Another object of this invention is to provide a drying system of the type described in which higher air temperatures may be utilized without danger of harming the product.

A further object of the invention is to provide a drying system of the above character in which the heated air is caused to pass over the product in one direction and then in an opposite direction as is determined to be most satisfactory for the product being dried, thereby permitting the use of hotter air in one of said directions of air movement, and resulting in more rapid and more uniform drying of the product.

The invention possess other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

FIGURE 1 is a diagrammatic side elevational view of the drying tunnel of the present invention.

FIGURE 2 is a cross-sectional view taken substantially in the plane indicated by line 2—2 of FIGURE 1.

The apparatus of the present invention will be seen to include an elongated structure 12 which is generally referred to in the trade as a drying tunnel. As above mentioned, the product to be dried, is first spread on trays 14, and the trays are then placed in the tunnel for the subsequent drying operation. The structure 12 is substantially enclosed, but is provided with doors 16 and 17 at the ends thereof for the purpose of permitting ingress of the wet product and removal of the dried product.

In accordance with the present invention, the structure 12 is divided into an upper chamber portion 18 and a lower chamber portion 19 by a horizontally extending sub ceiling 21. It will be noted that sub ceiling 21 is generally imperforate and extends to the side walls of the structure, but is spaced from the end walls so as to provide for air circulation between the upper and lower chamber portions in a manner to be hereinafter described. The trays are positioned in the lower chamber portion and as is customary in the art, heated air is adapted to be directed past the trays to effect drying of the product contained therein. It shall be pointed out that while the term "heated air" or a similar term may be used in the specification, such term is also intended to include any heated or cooled gas, such as the products of combustion of various burners, or mixtures of air and gas.

Positioned in the upper chamber 18, generally medially of the ends of the structure, is a blower means 22, and as an important feature of this invention, such means is of the reversible type, i.e., the blower can be rotated in one direction so as to cause air to circulate in a clockwise direction through the chambers 18 and 19, and can be rotated in a reverse direction whereby the air is circulated in a counterclockwise direction through the chambers. Since such blowers per se are well known, no detailed description is deemed necessary for purpose of describing the instant invention.

Means are provided for delivering heated air to the blower 22 so that the latter can effect movement of such air past the product. As here illustrated, a superstructure 26 is mounted on the top wall of structure 12, and a furnace 27 is positioned in the superstructure chamber 28. The furnace includes a burner 29, and when the furnace is operating, air in the chamber 28 will be heated, and by means presently to be described, will be supplied to the blower 22. The superstructure 26 is provided with a door 31 through which makeup air is delivered to the chamber 28 and to the furnace therein.

Communication between the furnace chamber 28 and chamber 18 in which the blower 22 is positioned is provided by means of a pair of openings 33 and 34 positioned on opposite sides of the blower. These openings are each provided with a closure 36 and 37 respectively, and when the blower is rotating to direct the heated air in a counter-clockwise direction, as viewed in FIGURE 1, closure 36 will be closed and closure 37 will be open. Upon contrarotation of the blower, and clockwise circulation of air through chambers 18 and 19, closure 37 will be closed and closure 36 will be opened.

As the heated air is caused to pass the wet product 13, moisture will be picked up, and if the same air was merely recirculated, it would soon have too high a moisture content to be effective as a drying agent. There is accordingly provided vent openings 41, 42 at opposite ends of chamber 18. The openings are provided with doors 43 and 44, the door 43 being closed and the door 44 being open during counter-clockwise air circulation, and the contrary situation during clockwise air circulation. The opening and closing of the doors could, of course, be performed manually, but preferably is operatively associated with the blower 22 so that the doors will open and close in response to the direction of rotation of the blower.

To complete the structural features of the present apparatus, I also provide thermostats 46 and 47 at opposite ends of chamber 18, such thermostats being operatively associated with the furnace structure in a conventional manner. Two thermostats are provided since the direction of air circulation can be reversed and it is necessary to control the temperature of the heated air prior to its contact with the product. In other words, when the air is moving counter-clockwise, thermostat 46 will be controlling, and during clockwise air movement, thermostat 47 is the operative unit.

With the foregoing structure in mind, the process of the present invention will now be discussed. As above mentioned, the product 13, disposed in trays 14 are loaded into chamber 19 through door 16. The furnace 27 is operated and blower 22 is rotated to effect a counter-clockwise air movement through chambers 18 and 19. It will be apparent that if this situation continued, the product adjacent the door 17, which is first contacted by the heated air, will be drier and hotter than the product at the other or downstream end of the chamber. Therefore, as an important feature of my invention, after a period of time, the blower's rotation is reversed and the heated air circulated in a clockwise direction. In this manner, a more uniform drying of the product from end to end of the chamber is effected.

By means of the separate thermostats 46 and 47, I also prefer to change the temperature of the heated air during each directional change. By switching the direction of air movement, I have found that I can raise the temperature of the air when the air is moving in each direction above that when only a single air direction is provided without any deleterious effect on the product.

By way of example, the air can be circulated through green sliced onions at a temperature of 190 degrees F. for some fifteen minutes, then reversed and brought to the standard drying temperature for onions of 120 degrees F. Using this procedure, the above mentioned drying apparatus will nearly double the output of one dehydrator tunnel.

The heating or upper chamber portion 18 and the product drying tunnel portion 19, as shown in the drawing, are disposed in vertical adjacent relation. It should be understood, however, that such vertical relationship might, for example, be changed to a side by side horizontal or other relationship without departing from the spirit of the invention.

What is claimed is:

1. Apparatus of the character described comprising an elongated housing defining a chamber and having product ingress and egress means at the opposite ends thereof, means in said chamber extending longitudinally and spaced from the ends thereof dividing the chamber into an upper portion and a lower portion adapted to receive product to be dried, reversible blower means associated with said upper chamber portion for circulating air through said chamber in both directions of longitudinal movement through said lower portion, and means delivering heated air to said blower means including a furnace overlying said upper portion of the chamber, and a pair of air inlet means communicating with said upper chamber portion on opposite sides of said blower means.

2. Apparatus as set forth in claim 1 including a furnace chamber in which said furnace is positioned, and pivotally mounted closures for said air inlet means.

References Cited by the Examiner

UNITED STATES PATENTS

| | | | |
|---|---|---|---|
| 1,603,103 | 10/1926 | Anderson | 34—48 |
| 1,887,581 | 11/1932 | Cowan | 34—46 X |
| 2,001,001 | 5/1935 | Thelen | 34—191 |
| 2,002,170 | 5/1935 | Barozzi | 34—191 |
| 2,340,633 | 2/1944 | Wigelsworth | 34—191 |
| 2,920,398 | 1/1960 | Liljenstrom | 34—46 |

OTHER REFERENCES

Forest Products Laboratory—Forest Service—U.S. Department of Agriculture "News and Views of This Kiln Drying Business," published November 1950 (1 page, Figure 1 relied on).

FREDERICK L. MATTESON, JR., *Primary Examiner.*

A. D. HERRMANN, *Assistant Examiner.*